United States Patent
Mandal et al.

(10) Patent No.: US 11,438,434 B2
(45) Date of Patent: Sep. 6, 2022

(54) SYSTEM AND A METHOD FOR GENERATING SERVICE ACTIONABLE FOR EQUIPMENT

(71) Applicant: Carrier Corporation, Palm Beach Gardens, FL (US)

(72) Inventors: Subhasis Mandal, Bangalore (IN); Yogesh B, Bangalore (IN); Vinoth Kumar Annamalai, Bangalore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/125,257

(22) Filed: Dec. 17, 2020

(65) Prior Publication Data
US 2021/0350942 A1    Nov. 11, 2021

(30) Foreign Application Priority Data

May 7, 2020  (IN) .............................. 202011019451

(51) Int. Cl.
| | |
|---|---|
| *G06F 15/173* | (2006.01) |
| *H04L 67/303* | (2022.01) |
| *G16Y 40/40* | (2020.01) |
| *G16Y 40/10* | (2020.01) |
| *G16Y 20/20* | (2020.01) |
| *G16Y 40/20* | (2020.01) |
| *G06Q 10/00* | (2012.01) |

(52) U.S. Cl.
CPC ............ *H04L 67/303* (2013.01); *G16Y 20/20* (2020.01); *G16Y 40/10* (2020.01); *G16Y 40/20* (2020.01); *G16Y 40/40* (2020.01); *G06Q 10/20* (2013.01)

(58) Field of Classification Search
CPC .............. H04L 41/147; H04L 41/0853; G05B 23/0283; G05B 2219/2614
USPC .................................................. 709/223, 224
See application file for complete search history.

(56) References Cited

U.S. PATENT DOCUMENTS

| | | |
|---|---|---|
| 10,139,788 B2 | 11/2018 | Dutta et al. |
| 10,417,565 B1 | 9/2019 | Millstein et al. |
| 2013/0339080 A1 | 12/2013 | Beaulieu et al. |
| 2014/0278165 A1 | 9/2014 | Wenzel et al. |
| 2015/0178865 A1 | 6/2015 | Anderson et al. |
| 2015/0212119 A1 | 7/2015 | Mezic et al. |
| 2016/0028605 A1 | 1/2016 | Gil et al. |
| 2016/0334825 A1 | 11/2016 | Nesler et al. |

(Continued)

*Primary Examiner* — Wing F Chan
*Assistant Examiner* — Andrew Woo
(74) *Attorney, Agent, or Firm* — Cantor Colburn LLP

(57) ABSTRACT

Aspects of the invention are directed towards a system and a method for generating service actionable for a plurality of equipment. Embodiments of the invention describe the method comprises steps of behaviorally classifying an equipment into normalizing classification and behavior classification. The method further comprises steps of processing the normalizing and behavior classifications to generate one or more profiles corresponding to the equipment. The one or more profiles represent time-granular behavior patterns of the equipment. The method comprises steps of generating time-granular normalized characteristics for the equipment and normalizing variances of the time-granular normalized characteristics and the time-granular behavior patterns to generate possible service actionable (SACT) recommendations that are integrated into workflows to drive action and receive prediction confirmation.

19 Claims, 9 Drawing Sheets

(56) References Cited

U.S. PATENT DOCUMENTS

| | | |
|---|---|---|
| 2017/0207926 A1 | 7/2017 | Gil et al. |
| 2017/0366414 A1 | 12/2017 | Hamilton et al. |
| 2018/0039238 A1 | 2/2018 | Gartner et al. |
| 2018/0046149 A1 | 2/2018 | Ahmed |
| 2018/0087790 A1 | 3/2018 | Perez |
| 2018/0356969 A1* | 12/2018 | Narain .................. G06F 3/0486 |
| 2018/0364654 A1 | 12/2018 | Locke et al. |
| 2018/0373234 A1* | 12/2018 | Khalate .................. G06N 7/005 |
| 2019/0066010 A1 | 2/2019 | Grussing |
| 2019/0138512 A1 | 5/2019 | Pourmohammad et al. |
| 2019/0187635 A1 | 6/2019 | Fan et al. |
| 2019/0188737 A1 | 6/2019 | Asenjo et al. |
| 2019/0243352 A1 | 8/2019 | Horgan et al. |
| 2019/0316802 A1 | 10/2019 | Alanqar et al. |
| 2019/0325368 A1 | 10/2019 | Turney et al. |
| 2019/0338972 A1 | 11/2019 | Schuster et al. |
| 2019/0346817 A1 | 11/2019 | Perez |
| 2019/0385070 A1 | 12/2019 | Lee et al. |

\* cited by examiner

SYSTEM AND A METHOD FOR GENERATING SERVICE ACTIONABLE FOR EQUIPMENT

CROSS-REFERENCE TO RELATED APPLICATIONS

This application claims priority to Indian Patent Application No. 202011019451, filed May 7, 2020, the contents of which are incorporated by reference herein in their entirety.

BACKGROUND

The present invention generally relates to IOT (Internet of Things) solutions for managing equipment and buildings. More particularly, the invention relates to a system and a method for generating equipment behavior and service actionable for a plurality of equipment located in a building/site.

Buildings, both residential and commercial, have a plurality of equipment. Such equipment offer similar services but are manufactured by different manufacturers, have different models and sizes. To predict failure or optimized operations of the equipment, it is important to understand the behavior of the equipment and identify reasons for a particular behavior of an equipment. The behavior of equipment can differ in many aspects. One aspect is whether an equipment is able to maintain a particular temperature under different environmental conditions which is different from its behavior related to whether the equipment is able to perform such functionality efficiently or without compromising its health. Also, the characteristics and behavior of the equipment continuously vary and need to be normalized over a desired time duration to make it usable. Moreover, various kinds of behaviors of equipment may overlap with each other with an aim to achieve a balance between their objectives. Overlapping behaviors of equipment may lead to misidentification or late identification of the right action that is required to be taken. Thus, defining a system due to different behavioral aspects of the equipment, where each of the behaviors for achieving different objectives can be isolated and then quantified within expected parameters is a tedious process. Further, to achieve a balance between all behavioral aspects that does not lead to failure of any objective, is a further complex process.

In addition, existing solutions are incapable of handling anomalous behavior of the equipment as soon as the equipment develop issues in performance. Consequently, avoiding non-comprehensive or late repairs lead to repeated failures, repairs only at breakdown, reduced lifecycle and increased maintenance cost. Moreover, in a typical site management system, alarms and fault detection and diagnostics (FDD) are typical solutions of identifying problems of the equipment before complete failure and are used for triggering workflows which need immediate attention. However, such alarms have the well-known problem of huge false positives, not being able to identify the real reason for which the symptom crosses threshold and also triggering just before failure of the equipment making it very reactive.

In view of the afore-mentioned problems in the existing solutions, there is a need of an effective system and a method for determining behavior of equipment. There is also a requirement of generating proactive insights based on the behavior of the equipment. In order to solve the problems in the existing solutions, a system and a method are disclosed.

SUMMARY

Various embodiments of the invention describe a system for generating equipment behavior. The system comprises a classification module, a profiling module, a normalized characteristics module and an insights and service actionable generation module. The classification module is configured to behaviorally classify an equipment associated with the system into normalizing classification and behavior classification based on characterized data and attributes received corresponding to the equipment. Further, the profiling module is configured to process the normalizing and behavior classifications to generate one or more profiles corresponding to the equipment. The one or more profiles represent time-granular behavior patterns of the equipment. The normalized characteristics module is configured to generate time-granular normalized characteristics for the equipment using the time-granular behavior patterns. The insights and service actionable generation module is configured to normalize variances of the generated time-granular normalized characteristics and the time-granular behavior patterns over a time duration to generate possible service actionable (SACT) recommendations that is integrated into workflows to drive action and receive prediction confirmation.

In an embodiment of the invention, the behavior patterns of the equipment are represented using one or more user-interpretable generalized performance categories depicting how the equipment operates internally and changes in a lifecycle of the equipment due to changing external conditions, end usage and intervention events for the equipment. Also, the one or more user-interpretable generalized performance categories comprise availability, compliance, health, optimized operations and efficiency, update and upgrade.

In another embodiment of the invention, the one or more profiles are built using the user-interpretable generalized performance categories and user-editable hierarchies with one or more interrelated editable dimensions for different types of end usage of the equipment and interpretation. Further, the editable dimensions for building up behavior comprise period dimension, usage dimension and performance behavior categorization and relationship dimension.

In an embodiment of the invention, the system is configured to classify the time granular behavior patterns for an equipment category such that the classifications are reusable in other equipment behaviors and autonomously editable for functionality in live-stream to reduce redundant processing and reprocessing for changes or variations in a new equipment. Also, the system is further configured to enable predefinition or incorporation of one or more additional elements of equipment behavior at each processing step by an onboarding/engineering user or by an autonomous system in a live data stream of characteristics to represent the equipment category.

In a different embodiment of the invention, the system is configured to normalize non-categorized performance behaviors using normalized usage classifications at a lowest time dimension period and to correlate the non-categorized performance behaviors with each other under each performance category to provide a performance category master and corresponding component behaviors.

In another embodiment of the invention, the period dimension from the user-editable hierarchies are used simultaneously along with the usage dimension to identify operation behavior of the equipment in context of usage pattern. The period dimension comprises behavior patterns at the lowest time dimension period, aggregated patterns based on a period signifying start and end of end usage and aggregated behavior patterns based on usage over multiple days for particular behavior pattern. And, the usage dimension for user-editable hierarchy comprises normalizing classification representing quantified end usage and behavior classifications representing the non-categorized performance behaviors.

In yet another embodiment of the invention, the system is configured to aggregate the performance category master behaviors and related component behaviors over time dimension hierarchy to build up behavior patterns to retain hierarchical relationship of causality between the performance category master and the component behaviors. Also, the master and the component behaviors are represented as indices which are combination of a name of a behavior, a state of the behavior, an age of the behavior and an aggregated key performance parameter over the age of the behavior.

In another embodiment of the invention, the system is configured to combine the master indices and the corresponding component indices to provide service actionable which has insights and recommendations for behavior correction of the equipment. Also, the combination of the master and component indices help in maintaining performance category attributes and the causality between the performance categories to enable identification of the SACT and accordingly increase severity of insights as the behavior patterns develop with time taken to implement the SACT.

In yet another embodiment of the invention, the system is configured to generate one or more predictive incidents based on the time-granular normalized characteristics and insights to provide an earlier view of an anomalous behavior of the equipment before converting an incident into a prediction for failure. Also, the system is further configured to place the generated predictive incidents into an immediate monitoring list and to graduate the predictive incidents to be a service actionable as the condition of the equipment persists.

In still another embodiment of the invention, the insights and service actionable generation module is further configured to suggest the generated SACT as a recommendation to a user. The recommendation comprises severity of a deteriorating behavior at that instance of time, a stage of deterioration with respect to overall predefined stages in which failure happens and an effect of combined anomalous behavior pattern on the equipment. Also, the insights and service actionable generation module is further configured to compute and update the user about number of days remaining to reach a final stage of failure.

In a different embodiment of the invention, the system is configured to auto-detect and incorporate an effect of an action taken on the SACT to validate the action in terms of quality and comprehensiveness.

In a different embodiment of the invention, the system is configured to self-learn and identify residual unidentified behaviors under each performance master category, to group the residual unidentified behaviors and to identify actions leading to a change in the residual unidentified behaviors.

In another embodiment of the invention, the system is configured to interact based on generalized intent represented as user-interpretable classifications rather than data values and for using one or more combinations of equipment behaviors representing different objectives to make behavior deterministic and isolated for a particular objective.

In yet another embodiment of the invention, the profiling module is configured to express an impact of dependency/relation of the equipment on other equipment as a deterministic classification to establish intransitive-transitive and transitive-transitive correlation amongst the equipment and the other equipment. Also, the establishment of relationship between the equipment and the other equipment enables conversion of characteristics into classification and correlating the generated classifications as part of profile generation to signify transitive behaviour of the equipment.

Various embodiments of the invention describe a method for generating equipment behavior. The method comprises steps of behaviorally classifying an equipment associated with a system into normalizing classification and behavior classification based on characterized data and attributes received corresponding to the equipment. The method further comprises steps of processing the normalizing and behavior classifications to generate one or more profiles corresponding to the equipment. The one or more profiles represent time-granular behavior patterns of the equipment The method also comprises steps of generating time-granular normalized characteristics for the equipment using the time-granular behavior patterns and normalizing variances of the generated time-granular normalized characteristics and the time-granular behavior patterns over a time duration to generate possible service actionable (SACT) recommendations that is integrated into workflows to drive action and receive prediction confirmation.

In an embodiment of the invention, the behavior patterns of the equipment are represented using one or more user-interpretable generalized performance categories depicting how the equipment operates internally and changes in a lifecycle of the equipment due to changing external conditions, end usage and intervention events for the equipment. Also, the one or more user-interpretable generalized performance categories comprise availability, compliance, health, optimized operations and efficiency, update and upgrade.

In another embodiment of the invention, the one or more profiles are built using the user-interpretable generalized performance categories and user-editable hierarchies with one or more interrelated editable dimensions for different types of end usage of the equipment and interpretation. Further, the editable dimensions for building up behavior comprise period dimension, usage dimension and performance behavior categorization and relationship dimension.

In an embodiment of the invention, the time granular behavior patterns for an equipment category is classified such that the classifications are reusable in other equipment behaviors and autonomously editable for functionality in live-stream to reduce redundant processing and reprocessing for changes or variations in new equipment. Also, predefinition or incorporation of one or more additional elements of equipment behavior are enabled at each processing step by an onboarding/engineering user or by an autonomous system in a live data stream of characteristics to represent the equipment category.

In a different embodiment of the invention, non-categorized performance behaviors are normalized using normalized usage classifications at a lowest time dimension period and to correlate the non-categorized performance behaviors with each other under each performance category to provide a performance category master and corresponding component behaviors.

In another embodiment of the invention, the period dimensions from the user-editable hierarchies are used simultaneously along with the usage dimension to identify operation behavior of the equipment in context of usage pattern. The period dimension comprises behavior patterns at the lowest time dimension period, aggregated patterns based on a period signifying start and end of end usage and aggregated behavior patterns based on usage over multiple days for particular behavior pattern. And, the usage dimension for user-editable hierarchy comprises normalizing classification representing quantified end usage and behavior classifications representing the non-categorized performance behaviors.

In yet another embodiment of the invention, performance category master behaviors and related component behaviors are aggregated over time dimension hierarchy to build up behavior patterns to retain hierarchical relationship of causality between the performance category master and the component behaviors. Also, the master and the component behaviors are represented as indices which are combination of a name of a behavior, a state of the behavior, an age of the behavior and an aggregated key performance parameter over the age of the behavior.

In another embodiment of the invention, the master indices and the corresponding component indices are combined to provide service actionable which has insights and recommendations for behavior correction of the equipment. Also, the combination of the master and component indices help in maintaining performance category attributes and the causality between the performance categories to enable identification of the SACT and accordingly increase severity of insights as the behavior patterns develop with time taken to implement the SACT.

In yet another embodiment of the invention, one or more predictive incidents are generated based on the time-granular normalized characteristics and insights to provide an earlier view of an anomalous behavior of the equipment before converting an incident into a prediction for failure. Also, the generated predictive incidents are placed into an immediate monitoring list and to graduate the predictive incidents to be a service actionable as the condition of the equipment persists.

In still another embodiment of the invention, the generated SACT are suggested as a recommendation to a user. The recommendation comprises severity of a deteriorating behavior at that instance of time, a stage of deterioration with respect to overall predefined stages in which failure happens and an effect of combined anomalous behavior pattern on the equipment. Also, a number of days remaining to reach a final stage of failure are computed and updated to the user.

In a different embodiment of the invention, an effect of an action taken on the SACT is auto-detected and incorporated to validate the action in terms of quality and comprehensiveness.

In a different embodiment of the invention, residual unidentified behaviors under each performance master category are self-learned and identified, to group the residual unidentified behaviors and to identify actions leading to a change in the residual unidentified behaviors.

In another embodiment of the invention, interactions based on generalized intent are represented as user-interpretable classifications rather than data values and for using one or more combinations of equipment behaviors representing different objectives to make behavior deterministic and isolated for a particular objective.

In yet another embodiment of the invention, an impact of dependency/relation of the equipment is expressed on other equipment as a deterministic classification to establish intransitive-transitive and transitive-transitive correlation amongst the equipment and the other equipment. Also, the establishment of relationship between the equipment and the other equipment enables conversion of characteristics into classification and correlating the generated classifications as part of profile generation to signify transitive behaviour of the equipment.

In another different embodiment of the invention, a computer readable medium is disclosed for generating equipment behavior. The computer readable medium comprises one or more processors and a memory is coupled to the one or more processors, the memory stores instructions executed by the one or more processors. The one or more processors are configured to behaviorally classify an equipment associated with a system into normalizing classification and behavior classification based on characterized data and attributes received corresponding to the equipment. The one or more processors are configured to process the normalizing and behavior classifications to generate one or more profiles corresponding to the equipment. The one or more profiles represent time-granular behavior patterns of the equipment. The one or more processors are configured to generate time-granular normalized characteristics for the equipment using the time-granular behavior patterns and to normalize variances of the generated time-granular normalized characteristics and the time-granular behavior patterns over a time duration to generate possible service actionable (SACT) recommendations that is integrated into workflows to drive action and receive prediction confirmation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Corresponding reference numerals indicate corresponding parts throughout the drawings.

DETAILED DESCRIPTION

Figure 1:
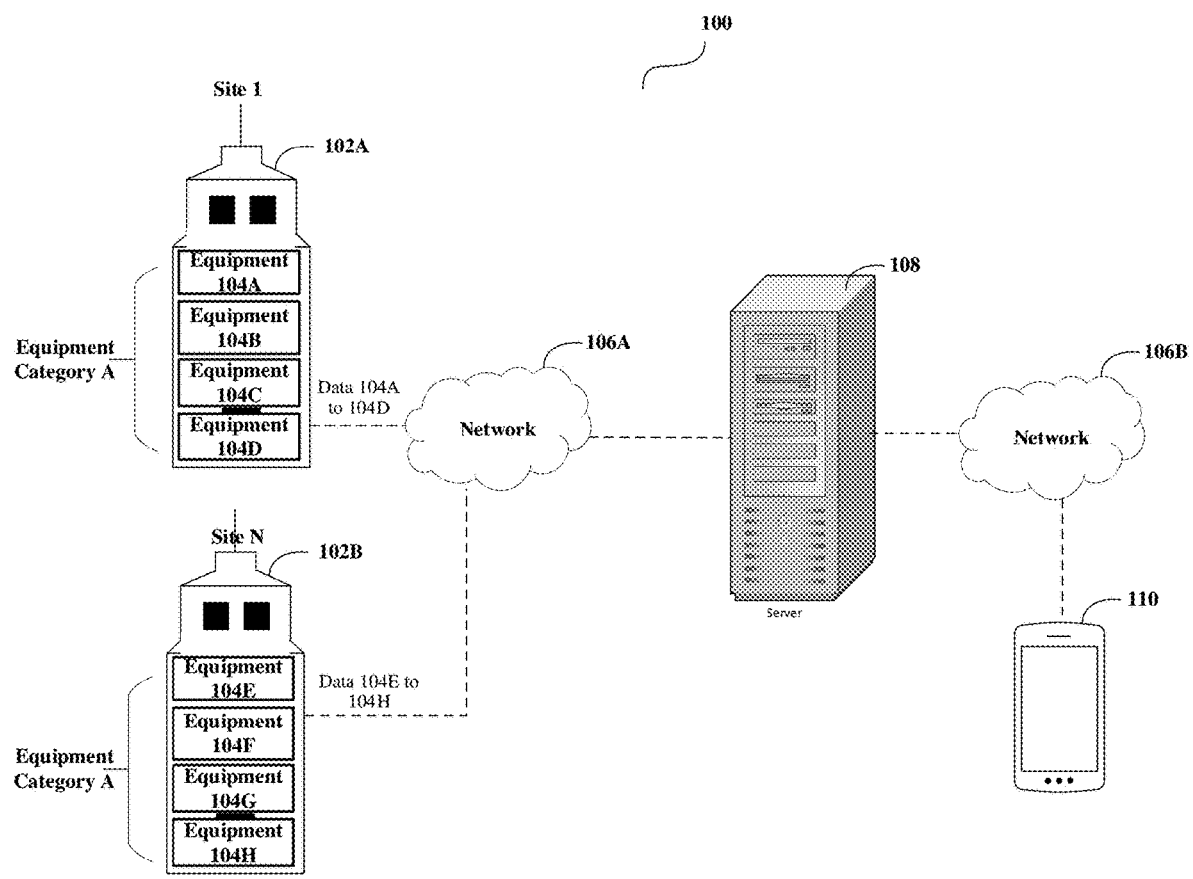
FIG. 1 depicts an exemplary system architecture according to an exemplary embodiment of the invention.

Described herein is a technology with a system and a method for generating generalized equipment behavior, predictive insights, service actionable and recommendations for a plurality of equipment located on a site. One or more sites may have a plurality of equipment present inside or outside the sites. Each of these plurality of equipment may also have the capability to transmit data stream to a server through a network. The server may generate characteristics or characterized data of the plurality of equipment from the data stream. Also, the server may also receive or determine attributes of the plurality of equipment.

Based on the characteristics or characterized data and the attributes of the plurality of equipment, the server may behaviorally classify equipment into normalizing classification and behavior classification. The server may further generate one or more profiles by processing the normalizing and behavior classifications. The one or more profiles may represent time-granular behavior patterns of the equipment. The server may also generate time-granular normalized characteristics for the equipment using the time-granular behavior patterns. Using the time granular equipment behavior and the time granular normalized characteristics, the server may generate service actionable recommendations for the plurality of equipment.

As used herein, the plurality of equipment may have capability to generate data stream as described below. Each of the plurality of equipment may be connected with the server through the network and transmit the data stream to the server. Such plurality of equipment may be refrigerators, air conditioners, heating, ventilation, and air conditioning (HVAC) systems, chillers, televisions, geysers, lights, laptop, computers, mobile devices, wearable devices, fans, cameras or any such equipment that is well known in the art.

As used herein, the server has processing capabilities as disclosed further in the specification. The server may be a cloud storage, a remote database, or any such storage known in the art.

As used herein, the network may refer to a wired network, a mesh network, a cellular network such as Global System for Mobile (GSM) network, a Long-Term Evolution (LTE) network, a code-division multiple access (CDMA) network, a narrow-band internet of thing (NB-IoT) technique or category M1 technique or any such network/technique that is known in the art.

Throughout the specification, reference numeral 102 depicts all sites. Each of the reference numerals 102A-102B may be considered as a separate site. Also, throughout the specification, reference numeral 104 depicts all equipment. Each of the reference numerals 104A-104H may be considered as a separate equipment.

FIG. 1 depicts an exemplary system architecture 100 according to an exemplary embodiment of the invention. As can be seen in FIG. 1, a building/site 102A may have a plurality of equipment, namely 104A, 104B, 104C and 104D. Similarly, another site 102B may also have four equipment, namely 104E, 104F, 104G and 104H. These equipment 104 may be located inside or outside the site 102. Further, each of these plurality of equipment 104 may determine data stream. The equipment 104 may generate and transmit the data stream to a server 108 through a network 106A. When the server 108 receives the data stream from each of the plurality of equipment 104, the server 108 may generate characteristics or characterized data for each of the plurality of equipment 104. The server 108 may generate the characteristics or characterized data using methodology as described in Indian Application No. 202011019422 Titled "A System And A Method For Uniformly Characterizing Equipment Category" which is incorporated herein by reference. The characteristics or characterized data for each of the plurality of equipment 104 and attributes (as described in Indian Application No. 202011019422 Titled "A System And A Method For Uniformly Characterizing Equipment Category") may be provided as inputs in a system 200 which is explained below. In an exemplary embodiment, the characteristics or characterized data may be uniform representations of the equipment 104 based on data points received in data stream from the equipment 104 of a particular equipment category. Further, some examples of the attributes are type of equipment, technology of equipment, make and model of an equipment. The server 108 may transmit output/s of each of the system 200, a system 300 and/or a system 400 to a device 110 through a network 106B, wherein the device 110 may exhibit such output/s.

Figure 2:
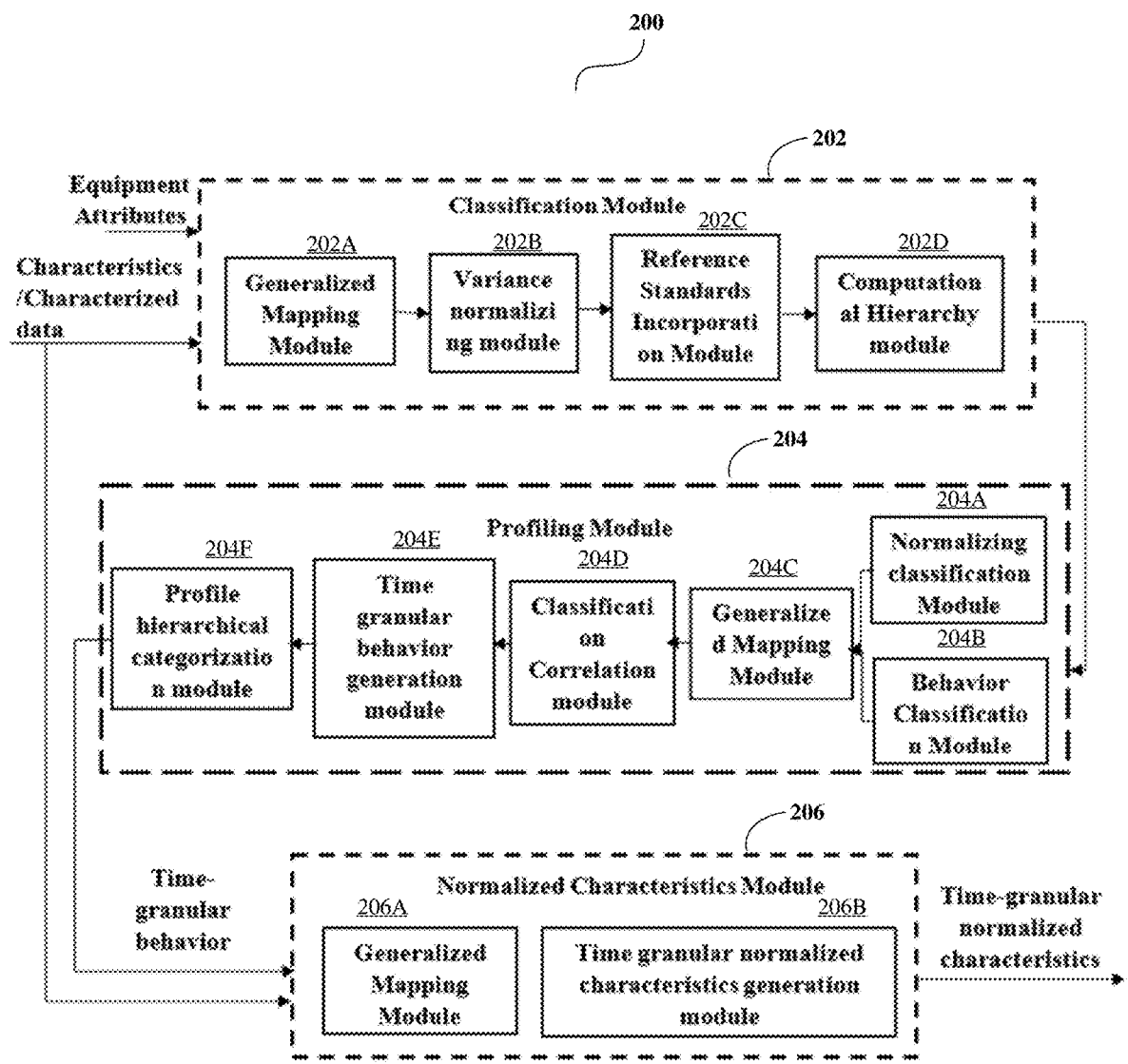
FIG. 2 depicts a block diagram of different components of an exemplary classification module, an exemplary profiling module and an exemplary normalization characteristics module according to an exemplary embodiment of the invention.

FIG. 2 depicts a block diagram of different components of an exemplary system 200 of the server 108 according to an exemplary embodiment of the invention. The system 200 may comprise of, but is not limited to, a classification module 202, a profiling module 204, and a normalized characteristics module 206. The classification module 202 may further comprise of, but is not limited to, a generalized mapping module 202A, a variance normalizing module 202B, a reference standards incorporation module 202C, and a computational hierarchy module 202D. The profiling module 204 may further comprise of, but is not limited to, a normalizing classification module 204A, a behavior classification module 204B, a generalized mapping module 204C, a classification correlation module 204D, a time-granular behavior generation module 204E, and a profile hierarchical categorization module 204F. Also, the normalized characteristics module 206 may further comprise of, but is not limited to, a generalized mapping module 206A and a time-granular normalized characteristics generation module 206B.

The classification module 202 may receive the characteristics or characterized data for each of the plurality of equipment 104 and the attributes as inputs. The generalized mapping module 202A may be configured to map the characteristics or characterized data and the attributes to various aggregation methods and may further be configured to map the output of aggregation methods to the data processing algorithms. In particular, the generalized mapping module 202A may map the characteristic of an equipment category to a right set of data processing algorithms to generate classifications. The set of data processing algorithms for classification are different for different equipment category. Further, the generalized mapping module 202A may map the characterized data of the equipment 104

(characteristics are generic across equipment category) to data processing algorithms for classifications. The data processing algorithms may be available as part of a library. This is done to behaviorally classify the equipment/s 104 associated with the system 200 into normalizing classification and behavior classification based on the characterized data and the attributes for the plurality of equipment 104. Further, the behaviors patterns of the equipment 104 may be represented using one or more user-interpretable generalized performance categories depicting how the equipment 104 operates internally and changes in a lifecycle of the equipment 104 due to changing external conditions, end usage and intervention events for the equipment 104. Also, the one or more user-interpretable generalized performance categories comprise availability, compliance, health, optimized operations and efficiency, update and upgrade. These one or more user-interpretable generalized performance categories are explained herein below:

(1) Availability: This category may relate to behaviors of the equipment 104 in a near failure condition (of both the equipment or end objective failures).

(2) Compliance: This compliance category may relate to behaviors of the equipment 104 for achieving their end objective.

(3) Health: This health category may relate to behaviors of the equipment 104 related to physical interactions of its components and effect as well as impact of other equipment 104 and external factors (4) Optimized Operations (Compliance impacting factors): This category may relate to behaviors of the equipment 104 around end usage operations which may be related to achieving the end usage objective of the equipment 104.

(5) Efficiency: This efficiency category may relate to behaviors of the equipment 104 around end usage operations which may be related to resource usage by equipment 104.

(6) Update and Upgrade: This category may relate to behaviors of the equipment 104 during and after a major change like a software updates or component upgrades.

The variance normalizing module 202B may be configured to normalize the characteristics or characterized data and the attributes of the plurality of equipment 104 as the characteristics of the equipment 104 are not uniformly available from each equipment 104 and differ based on data availability. Hence, similar characteristics can be utilized by different classification methodology to generate normalized/uniform classification. The reference standard incorporation module 202C may be configured to incorporate standard references in the normalized the characteristics or characterized data and the attributes. Standard references may be available as industry reference documents/data (e.g. product documentation or user manuals etc.) at various sources such as manufacturer's website. This data is imported or referred into the system 200 for further use.

The computation hierarchy module 202D may be configured to hierarchically process the characteristics/characterized data and the attributes for providing flexibility to choose the characterized data in a preferred order to behaviorally classify the equipment 104 into the normalizing classification and the behavior classification for the equipment 104. This is done so as to bridge the gap between availability of different types of characterized data. Further, the variances in the characteristics may be normalized. For an example, if the characteristics are different or not completely available (Full characteristics or partial characteristics). Such variances in characteristics may be normalized by choosing through a hierarchy of processing by the computation hierarchy module 202D i.e. in case of un-availability of certain characteristics data, additional characteristics which might be low quality in nature are utilized in different data processing algorithms to provide for additional classification in the hierarchy which may be utilized within the constraints of low quality. There may be some set of reference standards which are available and incorporated in the generated classifications. Depending on the quality and availability of the characteristics, the hierarchy is decided by the computation hierarchy module 202D.

The behaviorally classified equipment into the normalizing classification and the behavior classification (i.e. the output of the classification module 202) may be provided as an input to the profiling module 204. The normalizing classification module 204A and the behavior classification module 204B may be configured to process the normalized classification and the behavior classification. The profiling module 204 may use the normalized and behavior classifications to isolate different behaviors of the plurality of equipment 104. The normalized classifications may be subjective in nature. For an example, high values, low values, peak values, part values, etc. The normalized classification may indicate condition of an equipment 104. For example, whether the equipment is at peak load. The behavior classification may indicate behavior of the equipment 104 and may be represented as good, average, below average, null (in case of missing behavior). Thus, the behavior classification may indicate performance behavior of equipment 104 before it is correlated with other conditions.

Behavior classification and normalized classification may represent transitive and intransitive nature of the classification. For example, the behavior classification such as good, average, below average need to be correlated with other normalized and behavior classifications. A below average behavior is actually below average when the normalized behavior e.g. the equipment is at peak or part load. Thereby, a certain behavior of the equipment 104 is intransitive until it is correlated with all possible behaviors mapped in the system 200 to make it transitive and deterministic. As a result, an impact of dependency/relation of an equipment 104 on other equipment may be expressed as a deterministic classification to establish intransitive-transitive and transitive-transitive correlation amongst the equipment 104 and the other equipment. Such establishment of relationship between such equipment enables conversion of characteristics into classification and correlating the generated classifications as part of profile generation to signify transitive behavior of the equipment 104.

The generalized mapping module 204C may be configured to map the normalizing classification and the behavior classification to aggregation methods and further maps the output of aggregation methods to data processing algorithms to generate one or more profiles corresponding to the equipment 104. In particular, the generalized mapping module 204C may map the normalizing classification and the behavior classification to a right set of data processing algorithms to generate classifications. The set of data processing algorithms for classification are different for different equipment category. Further, the generalized mapping module 204C may map the normalizing classification and the behavior classification of the equipment 104 to data processing algorithms for classifications. The data processing algorithms may be available as part of a library. The classification correlation module 204D may be configured to correlate performance behavior to the normalized behaviors that establishes valid normalizing conditions to uniquely isolate different types of behavior. The classification correlation module 204D may also use combination of normalizers to multiplex/normalize the behaviors using English/local word filters. Results of normalizers are English/local words such as behavior are always good, average, below average.

The time-granular behavior generation module 204E may be configured to generate time-granular behavior patterns for the plurality of equipment 104 by combining the generated profiles at time granularity by performance categories. In an exemplary embodiment, the one or more profiles generated may represent time-granular behavior patterns of the equipment 104 which may be built using the user-interpretable generalized performance categories and user-editable hierarchies with one or more interrelated editable dimensions for different types of end usage of the equipment 104 and interpretation. Such profiles for the plurality of equipment 104 may comprise proactive indicator profiles. The proactive indicators for a particular category may be combined to form a master indicator profile based on behavior types (i.e. availability, compliance, health, efficiency etc. as explained below) of the equipment 104. The profile hierarchical categorization module 204F may be configured to categorize the generated profiles in a hierarchy for generating the time-granular behavior patterns of the equipment 104. Such a hierarchy also signifies the urgency of an anomalous behavior or unhealthy behavior of the equipment 104. Further, if such unhealthy behavior of the equipment 104 continues then this would result in further deterioration of health of the equipment 104 which would lead to behavior that signifies the inability of the equipment 104 to meet its objective and then finally complete failure of the equipment 104. Further, the profile hierarchical categorization module 204F may be configured to use categorized and editable hierarchies with multiple interrelated dimensions for different types of end usages of the equipment 104 and interpretation. Different editable hierarchy dimensions for building up the behavior may comprise, but is not limited to, period dimension, quantified usage dimension, performance behavior categorization and relationship dimension which are explained below.

1) Period dimension may comprise: a) behavior patterns of the equipment 104 at smallest period of time applicable (15 mins or hour); b) aggregated patterns of the equipment 104 based on a period signifying start and end of end usage (Day); and/or c) aggregated behavior patterns of the equipment 104 based on usage over multiple days for particular behavior pattern.

2) Usage dimension may comprise: The period dimensions from editable hierarchy may be used simultaneously along with the usage dimensions to identify operation behavior of the equipment in context of usage pattern. The usage dimension for editable hierarchy may comprise i.) Normalizing classification representing quantified end usage; and/or ii.) Behavior classifications representing non categorized performance behaviors.

3) Performance behavior categorization and relationship dimension may comprise: Non-categorized performance behaviors may be normalized using normalized usage classifications at a lowest time dimension period and to correlate the non-categorized performance behaviors with each other under each performance category to provide a performance category master and related component behaviors. Master and related component behaviors may be aggregated over time dimension hierarchy to build up behavior patterns to retain the hierarchical relationship of causality between the performance category master and the component behaviors to provide a set of master behaviors indices representing performance category and related component behavior indices. Further, the master and the component behaviors may be represented as indices which are combination of a name of a behavior, a state of the behavior, an age of the behavior and an aggregated key performance parameter over the age of the behavior. The combination of master and their components may provide service actionable having insights and recommendation for behavior correction of the equipment 104 which is explained in FIG. 3 below. This combination of the master and component indices may help in maintaining performance category attributes and the causality between the performance categories to enable identification of the service actionable and accordingly increase severity of insights as the behavior patterns develop with time taken to implement the service actionable.

The generated time-granular behavior patterns for the plurality of equipment 104 may be provided as an input to the normalized characteristics module 206. The generalized mapping module 206A may be configured to map the generated time-granular behavior to aggregation methods and further maps the output of aggregation methods to data processing algorithms to generate characteristics of the equipment 104. In particular, the generalized mapping module 206A may map the generated time-granular behavior to a right set of data processing algorithms to generate classifications. The set of data processing algorithms for time-granular behavior are different for different equipment category. Further, the generalized mapping module 206A may map the generated time-granular behavior of the equipment 104 to data processing algorithms for classifications. The data processing algorithms may be available as part of a library.

The time-granular normalized characteristics generation module 206B may be configured to generate time-granular normalized characteristics for the plurality of equipment 104 using the generated characteristics of the equipment 104. This embodiment of the present invention provides the advantage of uniform, isolated behavior classification model based on equipment performance categories independent of variances of equipment characteristics for different types of equipment usage and also provides the advantage of a single generalized definition for time granular behaviors which is independent of multitude of equipment under process. This embodiment of the present invention also provides an advantage of classifying the time granular behavior for the equipment category such that the classifications are the reusable in other equipment behaviors and autonomously editable for functionality in live-stream thus reducing redundant processing and reprocessing for changes or variations in new any equipment.

Figure 3:
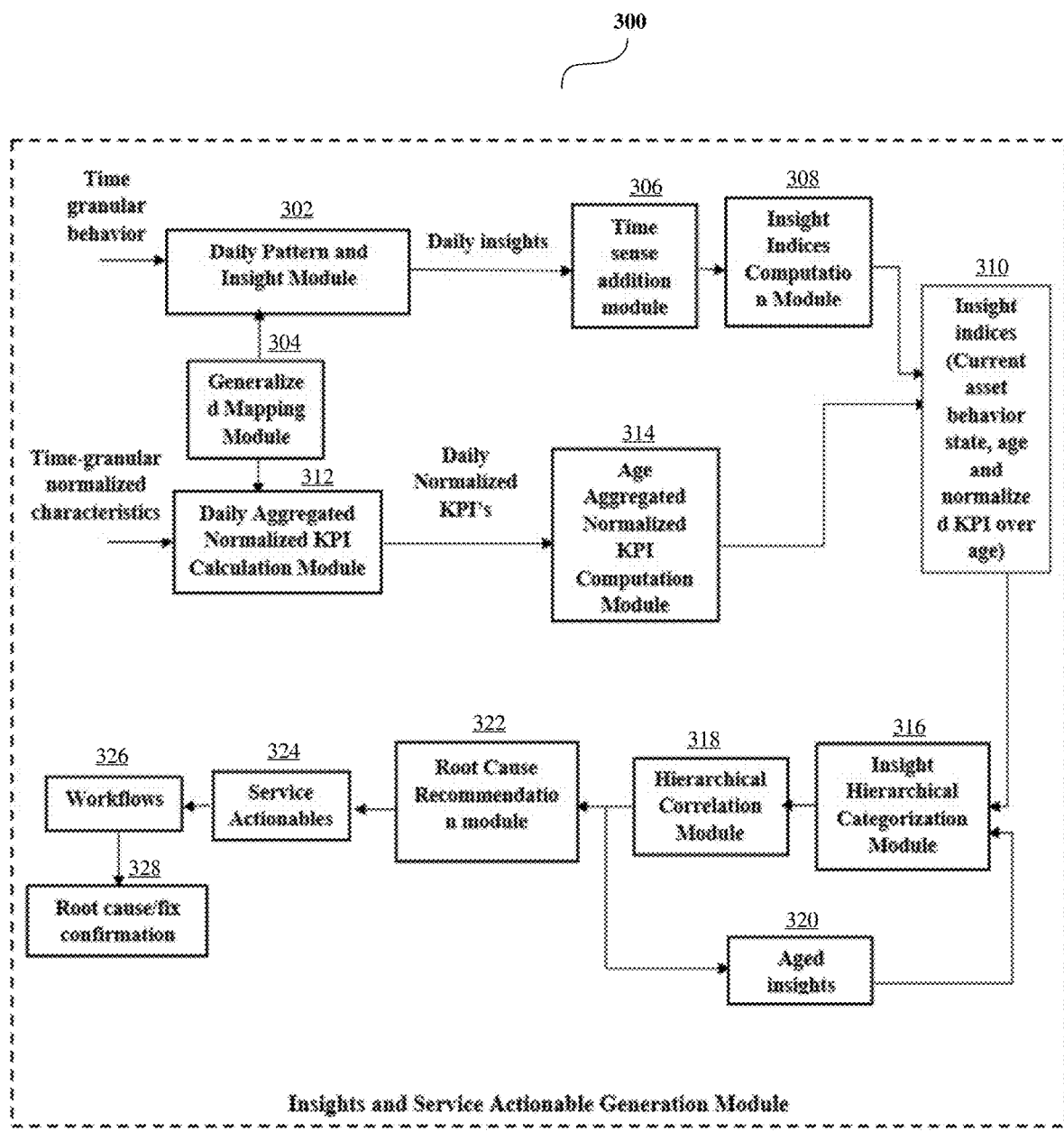
FIG. 3 depicts a block diagram of different components of an exemplary insights and service actionable generation module according to an exemplary embodiment of the invention.

FIG. 3 depicts a block diagram of different components of exemplary insights and service actionable generation module according to an exemplary embodiment of the invention. The exemplary insights and service actionable generation module 300 may be configured to normalize variances of generated equipment characteristics and behavior over a time duration using the time granular equipment behavior (output of the system 200) and the time granular normalized characteristics (output of the system 200) to generate possible service actionable (SACT) recommendations that are integrated into workflows to drive action and receive prediction confirmation. For doing this, the insights and service actionable generation module 300 may comprise of, but is not limited to, a daily pattern and insight module 302, a generalized mapping module 304, a time sense addition module 306, an insight indices computation module 308, an insight indices 310, a daily aggregated normalized key performance indicator (KPI) calculation module 312, an age aggregated normalized key performance indicator (KPI) computation module 314, an insight hierarchical categorization module 316, a hierarchical correlation module 318, an aged insight 320, a root cause recommendation module 322, a service actionable 324, workflows 326 and a root cause/fix confirmation 328.

The daily pattern and insight module 302 may be configured to use the time-granular behavior for the plurality of equipment 104 to create time-granular insight indicators. The daily pattern and insight module 302 may also be configured to correlate the time-granular insight indicators for identifying patterns over time and to generate daily insight profiles by transforming the time-granular insight indicators and using the identified patterns. The generalized mapping module 304 may be configured to map the time-granular normalized characterized data and the time-granular behavior patterns to aggregation methods and further map the output of aggregation methods to data processing algorithms. The time sense addition module 306 may be configured to add time sense to the generated insights indicators and the daily insight profiles is maintained to indicate the persistence of the identified pattern.

The daily aggregated normalized key performance indicator (KPI) calculation module 312 may be configured to convert the time-granular normalized characteristics data to daily-aggregated normalized characteristics/characteristics data for the plurality of equipment 104 using the time-granular insight indicators. The age aggregated normalized key performance indicator (KPI) computation module 314 may be configured to covert the daily-aggregated normalized characteristics data to age aggregated characteristics data for the plurality of equipment 104. The daily-aggregated normalized characteristics data are aggregated over age of state.

The insight indices computation module 308 may be configured to receive the daily insight profiles from the daily pattern and insight module 302. Then, the insight indices computation module 308 may be configured to generate insight indices based on pattern of their behavior using the daily insight profiles and the daily-aggregated normalized characteristics data. The insight indices 310 may be configured to receive the generated insight indices from the insight indices computation module 308 and the age aggregated characteristics data for the plurality of equipment 104 from the age aggregated normalized KPI computation module 314 to generate a set of indices to represent current performance state of the equipment's behavior, age of state and normalized KPI of performance state.

The insight hierarchical categorization module 316 and/or the hierarchical correlation module 318 may be configured to categorize the generated insight indices as master indices (such as availability, compliance, health and efficiency) with a set of component proactive indices associated with each master indices. The combination of the proactive indices with a particular state may provide possible service actionable (SACT) integrated into workflows to drive action and receive prediction confirmation. The aged insights 320 may be configured to determine insights which may be aged over a period of time. The root cause recommendation module 322 may be configured to identify the cause/reason for a problem occurred or is about to occur in the equipment 104 or badly impacting the equipment 104 in any manner.

The service actionable 324 may be configured to generate service actionable recommendation/s based on identified pattern of observed behavior/characteristics data of the equipment 104 over an extended time period (time sense). The service actionables 324 may use pattern recognition as part of a cognitive process that matches observed characteristics as a stimulus with information collected over a time period. The identified pattern or repeat in occurrence of the characteristics of an equipment 104 over a period of time span may lead to generation of service actionable. For an example, impact of refrigerant leak on cooling in an HVAC system. Persistence and increase in severity of the pattern of variables identifying refrigerant leak over a time span may lead to other detrimental conditions like impact on the bearing lubricated using the refrigerant. Such pattern over a period of time may require service actionable to be generated to notify a person for taking a corrective action at the earliest. However, if any corrective action is not taken for an identified pattern, the service actionable 324 may identify the pattern leading to the next stage of failure and predicting additional service actionable to prevent further stages of failure. Thus, a predictive service actionable is generated by the service actionables 324 based on the detected patterns and is able to adjust to identify additional patterns if the condition is allowed to fester. The system 300 hence identifies and indicates the urgency of the actionable at any point in time. The generated service actions may be serviced automatically or by a technician and reported back to the system 300 using the root cause/fix confirmation 328 which is explained below.

In an exemplary embodiment of the present invention, the workflows 326 may be configured to receive the generated service actionables/actions as an input from the service actionables 324 and may be configured to perform tracking actions and effect of the service actionable/actions on the equipment 104. In case, if any actions implemented on an equipment 104 are ineffective or partially effective, then in such case, the system 300 may track the new patterns and provides for the identification for the balance actions required to make the action completely effective. The output of the workflows 326 may be reusable in other modules of the system 200 or the system 300 and may be combined together to provide for a list of service actions required for any equipment 104 at any point of time to prevent any sort of future failures. The output of the any module may be integrated into the workflows 326 addressing the upkeep of the equipment 104 and may enrich the workflow 326 with predictions and insights. With the integration into the workflows 326, the workflows 326 may have an ability to get connected to an ecosystem of comfort, maintenance of the equipment 104 and efficiency processes and getting confirmation, feedback from the ecosystem for technicians working on both field and remote for the implementation of the service actions on the equipment 104 i.e. work completed and how the work was completed which provides confirmation and acts as labelling to be used for training and further learning by the system 300 to improve the quality and coverage of the predictions.

The root cause/fix confirmation 328 may be configured to provide a confirmation to the technicians (working on both field and remote) for the implementation of the service actions on the equipment 104. This may also include a confirmation for complete, partial or failure of implementation of the service actions on the equipment 104. The root cause recommendation module 322 may be configured to provide suggestion for further actions to be implemented on the equipment 104 based on the complete, partial or failure of implementation of the service actions on the equipment 104. In an exemplary embodiment, the root cause/fix confirmation 328 may provide a notification to a technician or a user of the system 300 regarding a status of the service actionable being implemented on the equipment 104.

Overall, the insights and service actionable generation module 300 may be configured to suggest the generated service actionable as a recommendation to the user. Such recommendation may comprise severity of a deteriorating behavior at that instance of time, a stage of deterioration with respect to overall predefined stages in which failure happens and an effect of combined anomalous behavior pattern on the equipment 104. The insights and service actionable generation module 300 may also be configured to compute and update the user about number of days remaining to reach a final stage of failure. Therefore, the classification module 202, the profiling module 204, the normalized characteristics module 206 and the insights and service actionable generation module 300 may be configured to generate generalized equipment behavior, predictive insights, service actionable and recommendations for early correction of anomalous behavior for different equipment categories from multiple time series equipment data streams.

Figure 4:
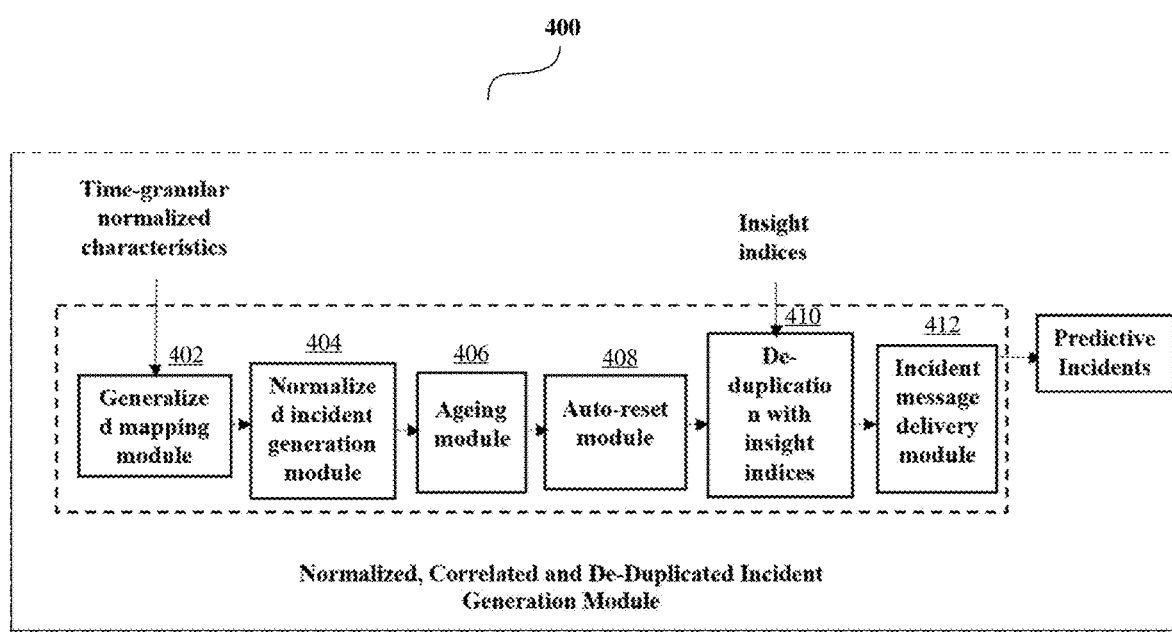
FIG. 4 depicts a block diagram of different components of an exemplary normalized, correlated and de-duplicated incident generation module according to an exemplary embodiment of the invention.

FIG. 4 depicts a block diagram of different components of exemplary normalized, correlated and de-duplicated incident generation module (or a predictive incident module) according to an exemplary embodiment of the invention. The exemplary normalized, correlated and de-duplicated incident generation module 400 may comprise of, but is not limited to, a generalized mapping module 402, a normalized incident generation module 404, an ageing module 406, an auto-reset module 408, a de-duplication with insight indices 410, and an incident message delivery module 412. In an exemplary embodiment, the normalized, correlated and de-duplicated incident generation module 400 may be part of the insights and service actionable generation module 300.

The generalized mapping module 402 may be configured to receive the time-granular normalized characteristics as an input from the system 300 and map the time-granular normalized characteristics with the gathered incident data. The normalized incident generation module 404 may be configured to generate incidents based on current behavior of the equipment 104 and state normalized over the age (age aggregated). The normalized incident generation module 404 may also be configured to combine the current behavior of the equipment 104 with the expected key performance indicator (KPI) defined for the equipment 104. The ageing module 406 may be configured to calculate the age or hours of anomalous behavior exhibited by the equipment 104. The auto-reset module 408 may be configured to reset the normalized incident generation module 404 after the system 400 converts the anomalous behavior of the equipment 104 into predictions for failure with service action recommendations. The de-duplication with insight indices 410 may be configured to receive the insight indices as an input and may be configured to remove any/all duplicate entry to avoid false alarms. Further, the prolonged behavior of the characteristics data of the equipment 104 over a period of time may lead to generation of duplicated incidents. The incident message delivery module 412 may be configured to deliver the identified incident notifications as one or more predictive incidents to a user of the system 400 on the anomalous behavior noted and if the user wants to start planning for any corrective actions. The one or more predictive incidents may be based on the time-granular normalized characteristics and the insights to provide earlier view of anomalous behavior of the equipment 104 before converting an incident into a prediction for failure. Further, the generated predictive incidents may be placed into an immediate monitoring list and to graduate the predictive incidents to be service actionable as the condition of the equipment 104 persists. This embodiment of the present invention provides the advantage of providing a clear actionable measure at every associated time interval for summarization in different categories of equipment behavior and easy to track the undesired behavior groups and form patterns over time which can identify the reason and action or fix for the undesired behavior.

In an exemplary embodiment, the system 200, the system 300 and the system 400 are part of the server 108 and are inter-connected with each other. In another exemplary embodiment, the system 200, the system 300 and the system 400 can be a single system.

Figure 5:
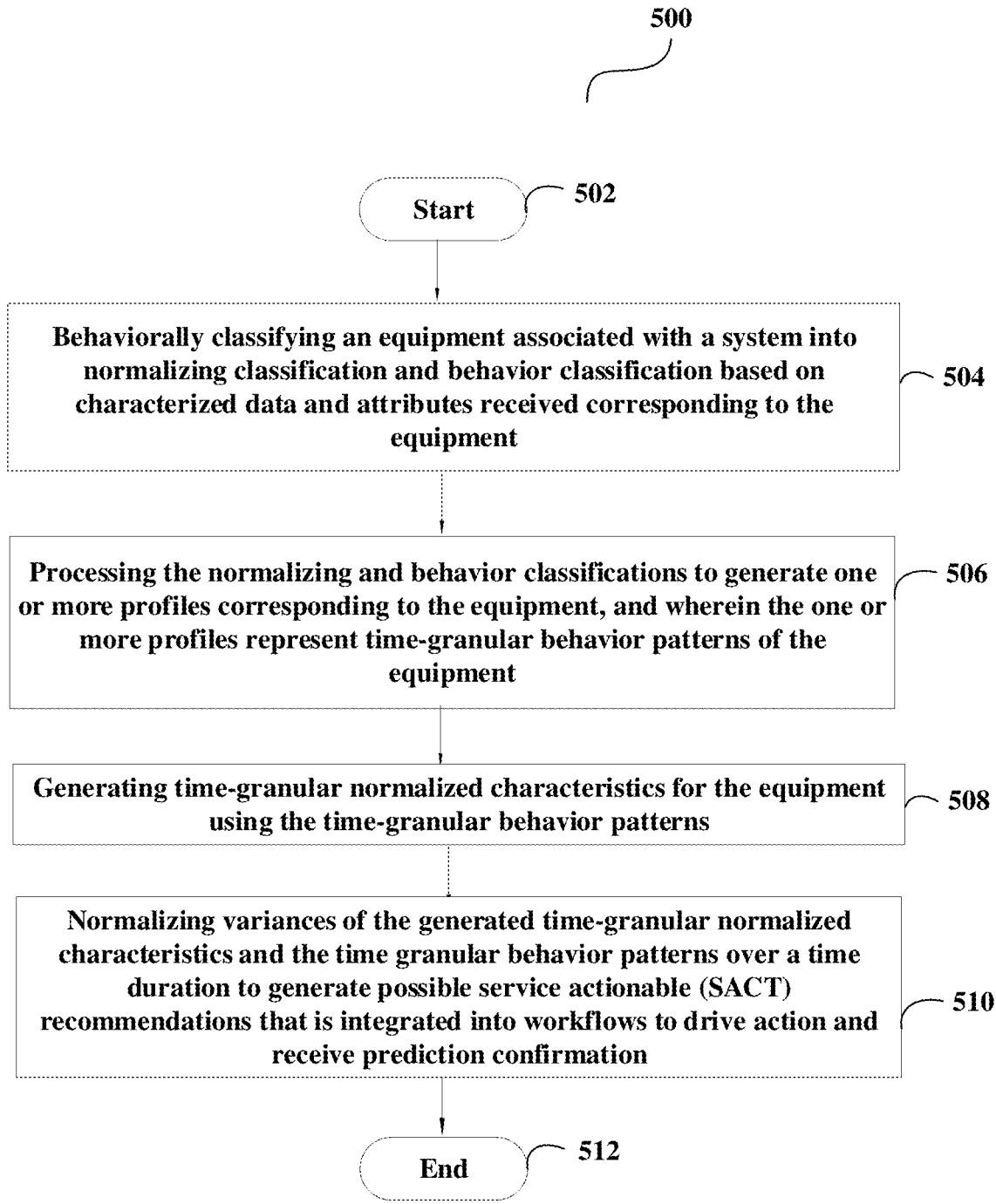
FIG. 5 depicts an exemplary flowchart illustrating a method to perform the invention according to an exemplary embodiment of the invention.

FIG. 5 depicts a flowchart outlining the features of the invention in an exemplary embodiment of the invention. The method flowchart 500 describes a method for generating service actionable for a plurality of equipment 104 located at a site 102. The method flowchart 500 starts at step 502.

At step 504, a system 200 may behaviorally classify an equipment 104 associated with a system into normalizing classification and behavior classification based on characterized data and attributes received corresponding to the equipment 104. This has been explained in detail in FIG. 2 above.

At step 506, the system 200 may process the normalizing and behavior classifications to generate one or more profiles corresponding to the equipment 104. The one or more profiles may represent time-granular behavior patterns of the equipment 104 which may be built using the generalized performance categories and user-editable hierarchies with one or more interrelated dimensions for different types of end usage of the equipment 104 and interpretation. This has been explained in detail in FIG. 2 above.

At step 508, a system 200 may generate time-granular normalized characteristics for the equipment 104 using the time-granular behavior patterns. This has been explained in detail in FIG. 2 above.

At step 510, the system 300 may normalize variances of the generated time-granular normalized characteristics and the time granular behavior patterns over a time duration using the time granular equipment behavior and the time granular normalized characteristics to generate possible service actionable (SACT) recommendations that is integrated into workflows to drive action and receive prediction confirmation. This has been explained in detail in FIG. 3 above. Then, the method flowchart 500 may end at 512.

The system 200/300/400 of the present invention further enables some predefinition or incorporation of one or more additional elements of the equipment 104's behavior at each processing step by an onboarding/engineering user or by an autonomous system in a live data stream of the characteristics representing an equipment category. The system 200/300/400 of the present invention further facilitates the system 300 to auto-detect and incorporate an effect of an action taken on the service actionable to validate the action in terms of quality and comprehensiveness. The system 200/300/400 may also able to self-learn and identify residual unidentified behaviors under each performance master category, to group the residual unidentified behaviors and identify actions which lead to a change in the residual unidentified behaviors. The system 200/300/400 may further be configured to interact based on generalized intent represented as user-interpretable classifications rather than data values and for using one or more combinations of equipment behaviors representing different objectives to make behavior deterministic and isolated for a particular objective.

Figure 6A:
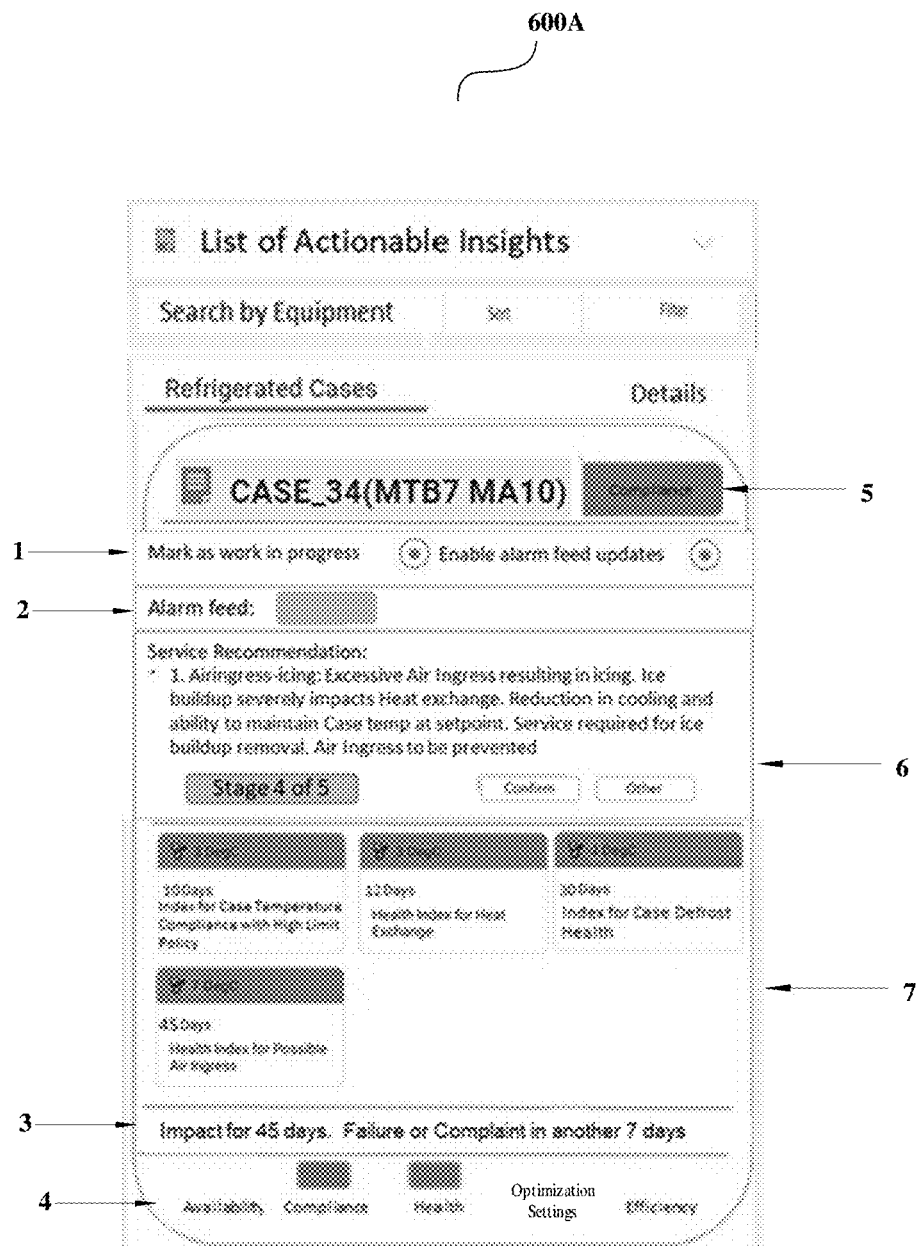
FIG. 6A depicts screenshot on system as an exemplary service actionable recommendations and behavior pattern representation for a chiller equipment according to an exemplary embodiment of the invention.

FIG. 6A depicts an exemplary service actionable recommendations and behavior pattern representation 600A for a refrigerated case according to an exemplary embodiment of the invention. As can be seen, a list of actionable insights for refrigerated case are provided in a screenshot depicted in FIG. 6A. Example is for a refrigerated case with name "CASE_34" and serial number "MTB7 MA10" by the system 200/300/400. Further, at Point 1, the attributes are used by the user to mark as work in progress. These can be further integrated with work orders. At Point 2, alarms are integrated into predictive actionable insights. The users are also facilitated to enable or disable alarm feed updates in predictive actionable insight updates. At Point 3, age aggregated data: indicates age from first detection till date which is provided as "Impact for 45 days, Failure or Complaint in another 7 days". At this point, prediction to number of days to failure and the age in number of hours/days of anomalous behavior exhibited by an equipment can be shown. At point 4, multiple anomalous behavior indices are converged into master performance categories for equipment. At Point 5, master performance category and attributes obtained by converging multiple anomalous behavior indices. This indicates the equipment is in this impacted master performance category (in this case is "Compliance").

At Point 6, failure lifecycle is converted into stages and as equipment deteriorates, prediction is updated with respect to stage of failure. The combination of master performance categories and their components provide service actionable having insights and recommendation for behavior correction of equipment is shown. Also, recommendation of cause of failure and impact on equipment operation at each stage is provided. Further, such recommendation can be confirmed by the user and the user can add recommendations. For an example, service recommendations are provided such as "Airingress-icing: Excessive Air Ingress resulting in icing. Ice buildup severely impacts Heat exchange. Reduction in cooling and ability to maintain Case temp at setpoint. Service required for ice buildup removal. Air Ingress to be prevented. Stage 4 of 5". At Point 7, multiple anomalous indices are shown as detected with the passing time duration. For an example, Index for case temperature, Compliance with high limit policy is anomalous for 10 days with an aggregated normalized deviation of 3 degree Celsius and Health Index for Heat Exchange is showing an anomalous behavior for 12 days with low normalized heat exchange effectiveness of 3 degree Celsius and so on.

Figure 6B:
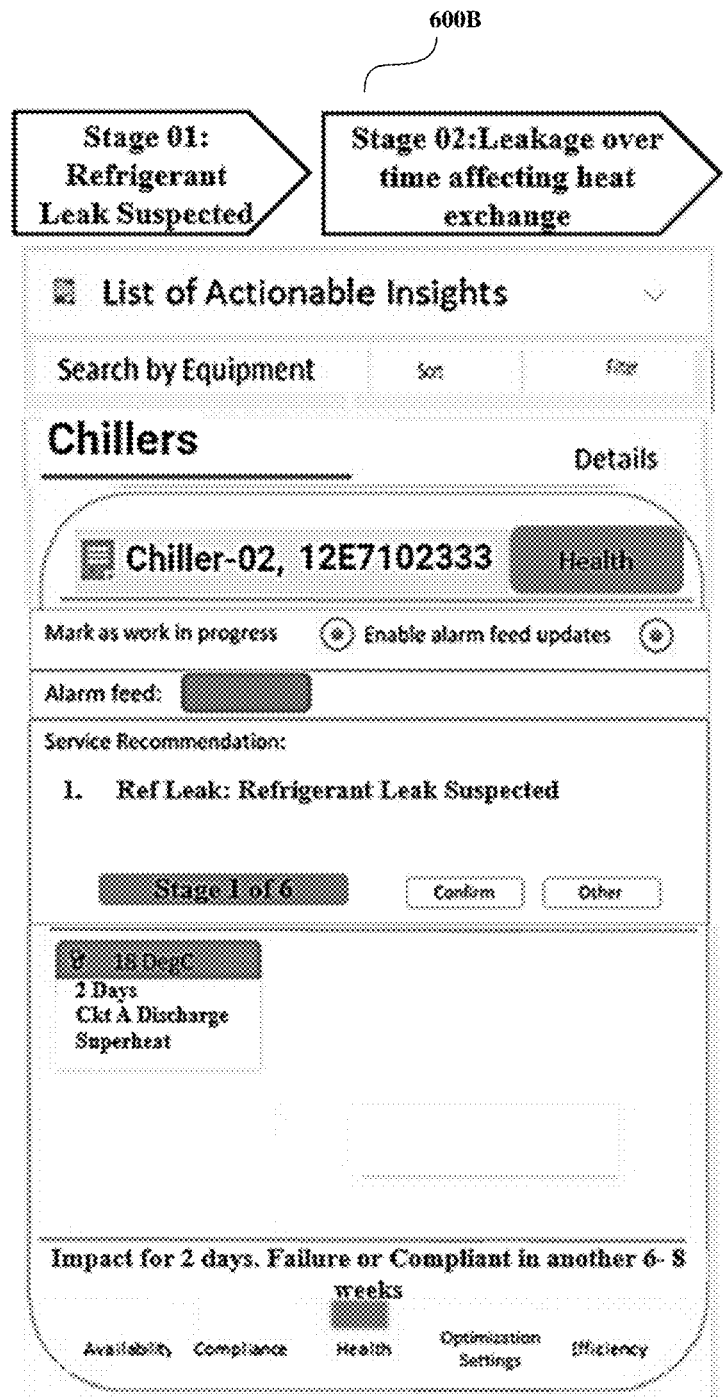
FIGS. 6B-6D depict screenshots reflecting changes in service actionable recommendations along with behavior patterns for deterioration in the chiller equipment according to an exemplary embodiment of the invention.
Figure 6C:
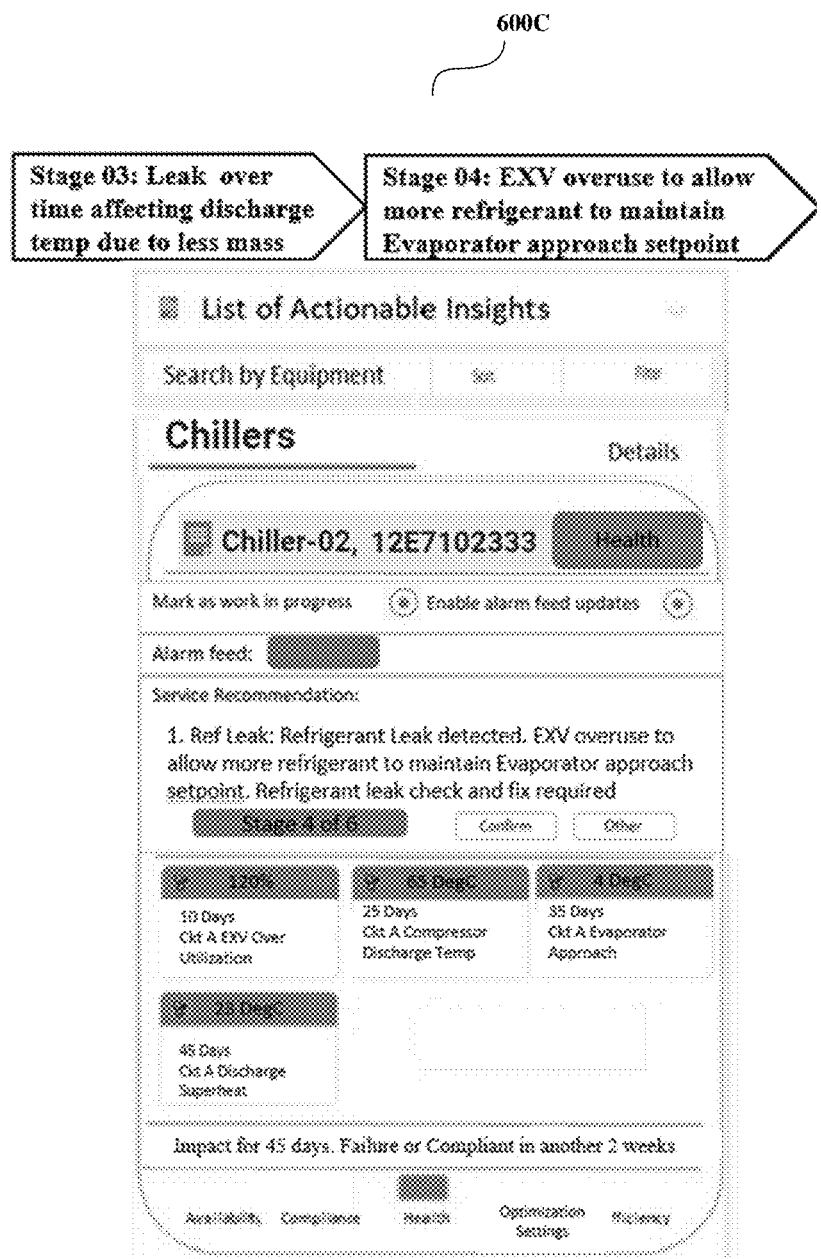
Figure 6D:
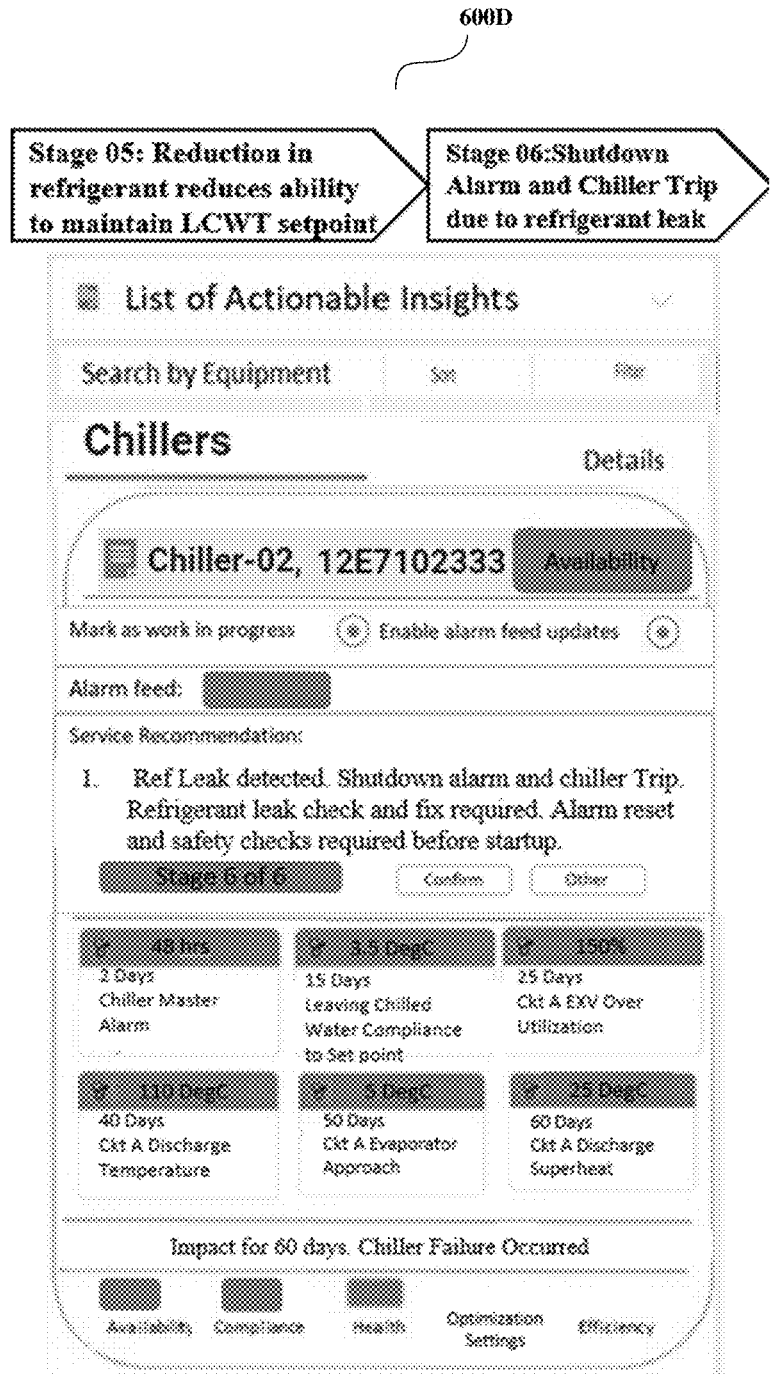

FIGS. 6B-6D depict an example of predictive actionable insights generation for Chillers along with generated service recommendations in the given screenshots. The problem of refrigerant leak and its effect on performance of chiller over a period of time is depicted. Various stages show the aggravation of problem over a period of time. At each stage, service actionable are generated and shown to the user as a recommendation. FIG. 6B depicts an exemplary service actionable recommendation along with behavior patterns 600B for deterioration in the chiller equipment according to an exemplary embodiment of the invention. In this example 600B, Stage 01—Refrigerant Leak Suspected and Stage 02 Leakage over time affecting heat exchange are shown. As can also be seen in this example 600B, an actionable insight for a Chiller-02, 12E7102333 is provided. "Ref Leak: Refrigerant Leak Suspected" is provided as a service recommendation for Stage 1 of 6 and an anomalous indices (i.e. Circuit A discharge superheat behavior anomalous for two days and normalized metric being 18 degree Celsius) is shown. Prediction to number of days to failure is shown as 6-8 weeks with impact for 2 days and "Health" is shown as a master performance category for the chiller.

FIG. 6C depicts an exemplary service actionable recommendation along with behavior patterns 600C for deterioration in the chiller equipment according to an exemplary embodiment of the invention. In this example 600C, the previous condition has progressed through Stage 03—Leak over time affecting discharge temperature due to less mass and is now at Stage 04—Refrigerant leak progress over time and now resulting in Expansion Valve (EXV) overuse to allow more refrigerant to maintain evaporator approach setpoint are shown. As can also be seen in this example 600C, an actionable insight for a Chiller-02, 12E7102333 is provided. "Ref Leak: Refrigerant Leak Detected, EXV overuse to allow more refrigerant to maintain evaporator approach setpoint. Refrigerant leak check and fix required." is provided as a service recommendation for Stage 4 of 6. Also, several anomalous indices are shown. i.e. Circuit A discharge superheat behavior anomalous for 45 days, Circuit A Evaporator approach for 35 days, Circuit A compressor discharge temperature for 25 days and EXV over utilization for 10 days along with relevant normalized metrices for each indices establishing a timeline of deterioration of chiller health due to refrigerant leak arriving at stage 4 out of 6 stages of the failure lifecycle for cause identified as refrigerant leak. Prediction of number of days to failure is shown as 2 weeks with impact for 45 days and "Health" is shown as a master performance category for the chiller.

FIG. 6D depicts an exemplary service actionable recommendation along with behavior patterns 600D for deterioration in the chiller equipment according to an exemplary embodiment of the invention. In this example 600D, the previous condition has progressed through Stage 05—Reduction in refrigerant reduces ability to maintain LCWT setpoint and is at final stage of failure i.e. Stage 06—Shutdown alarm and chiller trip due to refrigerant leak are shown. The service recommendation is provided as "Refrigerant Leak detected. Shutdown alarm and chiller Trip. Refrigerant leak check and fix required. Alarm reset and safety checks required before startup". Representation of the service actionable recommendation also includes additional elements as applicable for final stage in similar fashion as before.

The present invention is applicable in any industry/field that is well known in the art and where an equipment is utilized. The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a system 200 and/or a system 300. A computer readable medium comprises one or more processors and a memory coupled to the one or more processors, the memory stores instructions executed by the one or more processors. The one or more processors are configured to behaviorally classify an equipment 104 associated with a system into normalizing classification and behavior classification based on characterized data and attributes received corresponding to the equipment 104. The one or more processors are configured to process the normalizing and behavior classifications to generate one or more profiles corresponding to the equipment 104. The one or more profiles represent time-granular behavior patterns of the equipment 104. The one or more processors are configured to generate time-granular normalized characteristics for the equipment 104 using the time-granular behavior patterns and to normalize variances of the generated time-granular normalized characteristics and the time-granular behavior patterns over a time duration to generate possible service actionable (SACT) recommendations that are integrated into workflows to drive action and receive prediction confirmation.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for generating equipment behavior, comprising:
a processor coupled to a memory, the memory storing instructions executed by the processor, the processor further comprising:
a classification module configured to classify an equipment associated with the system into normalizing classification and behavior classification based on characterized data and attributes received corresponding to the equipment;
a profiling module configured to process the normalizing and behavior classifications to generate one or more profiles corresponding to the equipment, wherein the one or more profiles represent time-granular behavior patterns of the equipment;
a normalized characteristics module configured to generate time-granular normalized characteristics for the equipment using the time-granular behavior patterns;
an insights and service actionable generation module configured to normalize variances of the generated time-granular normalized characteristics and the time-granular behavior patterns over a time duration to generate possible service actionable (SACT) recommendations that is integrated into workflows to drive action and receive prediction confirmation;
wherein the normalized characteristics module is configured to classify the time granular behavior patterns for an equipment category such that the classifications are reusable in other equipment behaviors and autonomously editable for functionality in live-stream to reduce redundant processing and reprocessing for changes or variations in new equipment, and wherein predefinition or incorporation of one or more additional elements of equipment behavior are enabled at each processing step by an onboarding/engineering user or by an autonomous system in a live data stream of characteristics to represent the equipment category.

2. The system of claim 1, wherein the behavior patterns of the equipment are represented using one or more user-interpretable generalized performance categories depicting how the equipment operates internally and changes in a lifecycle of the equipment due to changing external conditions, end usage and intervention events for the equipment, and wherein the one or more user-interpretable generalized performance categories comprise availability, compliance, health, optimized operations and efficiency, update and upgrade.

3. The system of claim 2, wherein the one or more profiles are built using the user-interpretable generalized performance categories and user-editable hierarchies with one or more interrelated editable dimensions for different types of end usage of the equipment and interpretation, and wherein the editable dimensions for building up behavior comprise period dimension, usage dimension and performance behavior categorization and relationship dimension.

4. The system of claim 1, wherein the system is configured to generate one or more predictive incidents based on the time-granular normalized characteristics and insights to provide an earlier view of an anomalous behavior of the equipment before converting an incident into a prediction for failure, and wherein the system is further configured to place the generated predictive incidents into an immediate monitoring list and to graduate the predictive incidents to be a service actionable as the condition of the equipment persists.

5. The system of claim 1, wherein the insights and service actionable generation module is further configured to suggest the generated SACT as a recommendation to a user, and wherein the recommendation comprises severity of a deteriorating behavior at that instance of time, a stage of deterioration with respect to overall predefined stages in which failure happens and an effect of combined anomalous behavior pattern on the equipment, and wherein the insights and service actionable generation module is further configured to compute and update the user about number of days remaining to reach a final stage of failure.

6. The system of claim 1, wherein the system is configured to auto-detect and incorporate an effect of an action taken on the SACT to validate the action in terms of quality and comprehensiveness.

7. The system of claim 1, wherein the system is configured to self-learn and identify residual unidentified behaviors under each performance master category, to group the residual unidentified behaviors and to identify actions leading to a change in the residual unidentified behaviors.

8. The system of claim 1, wherein the profiling module is further configured to express an impact of dependency/relation of the equipment on other equipment as a deterministic classification to establish intransitive-transitive and transitive-transitive correlation amongst the equipment and the other equipment, and wherein the establishment of relationship between the equipment and the other equipment enables conversion of characteristics into classification and correlating the generated classifications as part of profile generation to signify transitive behavior of the equipment.

9. A method for generating equipment behavior, comprising:
classifying an equipment associated with a system into normalizing classification and behavior classification based on characterized data and attributes received corresponding to the equipment;
processing the normalizing and behavior classifications to generate one or more profiles corresponding to the equipment, and wherein the one or more profiles represent time-granular behavior patterns of the equipment;
generating time-granular normalized characteristics for the equipment using the time-granular behavior patterns; and
normalizing variances of the generated time-granular normalized characteristics and the time-granular behavior patterns over a time duration to generate possible service actionable (SACT) recommendations that is integrated into workflows to drive action and receive prediction confirmation;
aggregating performance category master behaviors and related component behaviors over time dimension hierarchy to build up behavior patterns to retain hierarchical relationship of causality between the performance category master and the component behaviors, and wherein the master and the component behaviors are represented as indices which are combination of a name of a behavior, a state of the behavior, an age of the behavior and an aggregated key performance parameter over the age of the behavior.

10. The method of claim 9, further comprising, classifying the time granular behavior patterns for an equipment category such that the classifications are reusable in other equipment behaviors and autonomously editable for functionality in live-stream to reduce redundant processing and reprocessing for changes or variations in new equipment, and wherein predefinition or incorporation of one or more additional elements of equipment behavior are enabled at each processing step by an onboarding/engineering user or by an autonomous system in a live data stream of characteristics to represent the equipment category.

11. The method of claim 10, further comprising, normalizing non-categorized performance behaviors using normalized usage classifications at a lowest time dimension period and correlating the non-categorized performance behaviors with each other under each performance category to provide a performance category master and corresponding component behaviors.

12. The method of claim 9, further comprising, combining the master indices and the corresponding component indices to provide service actionable which has insights and recommendations for behavior correction of the equipment, and wherein the combination of the master and component indices help in maintaining performance category attributes and the causality between the performance categories to enable identification of the SACT and accordingly increase severity of insights as the behavior patterns develop with time taken to implement the SACT.

13. The method of claim 9, further comprising, generating one or more predictive incidents based on the time-granular normalized characteristics and insights to provide an earlier view of an anomalous behavior of the equipment before converting an incident into a prediction for failure, and wherein the generated predictive incidents are placed into an immediate monitoring list and graduating the predictive incidents to be a service actionable as the condition of the equipment persists.

14. The method of claim 9, further comprising, suggesting the generated SACT as a recommendation to a user, and wherein the recommendation comprises severity of a deteriorating behavior at that instance of time, a stage of deterioration with respect to overall predefined stages in which failure happens and an effect of combined anomalous behavior pattern on the equipment, and wherein computing and updating the user about number of days remaining to reach a final stage of failure.

15. The method of claim 9, further comprising, auto-detecting and incorporating an effect of an action taken on the SACT to validate the action in terms of quality and comprehensiveness.

16. The method of claim 9, further comprising, self-learning and identifying residual unidentified behaviors under each performance master category, grouping the residual unidentified behaviors and identifying actions leading to a change in the residual unidentified behaviors.

17. The method of claim 16, further comprising, interacting based on generalized intent represented as user-interpretable classifications rather than data values and for using one or more combinations of equipment behaviors representing different objectives to make behavior deterministic and isolated for a particular objective.

18. The method of claim 9, further comprising, expressing an impact of dependency/relation of the equipment on other equipment as a deterministic classification to establish intransitive-transitive and transitive-transitive correlation amongst the equipment and the other equipment, and wherein the establishment of relationship between the equipment and the other equipment enables conversion of characteristics into classification and correlating the generated classifications as part of profile generation to signify transitive behavior of the equipment.

19. A non-transitory computer readable medium executable by one or more processors coupled to a memory, the memory storing instructions executed by the one or more processors, the one or more processors configured to:
  classify an equipment associated with a system into normalizing classification and behavior classification based on characterized data and attributes received corresponding to the equipment;
  process the normalizing and behavior classifications to generate one or more profiles corresponding to the equipment, and wherein the one or more profiles represent time-granular behavior patterns of the equipment;
  generate time-granular normalized characteristics for the equipment using the time-granular behavior patterns; normalize variances of the generated time-granular normalized characteristics and the time-granular behavior patterns over a time duration to generate possible service actionable (SACT) recommendations that is integrated into workflows to drive action and receive prediction confirmation;
  aggregate performance category master behaviors and related component behaviors over time dimension hierarchy to build up behavior patterns to retain hierarchical relationship of causality between the performance category master and the component behaviors, and wherein the master and the component behaviors are represented as indices which are combination of a name of a behavior, a state of the behavior, an age of the behavior and an aggregated key performance parameter over the age of the behavior.

* * * * *